July 15, 1941.    J. D. FRYE    2,249,124
WEIGHING SCALES
Filed Aug. 9, 1939    5 Sheets-Sheet 2

J. D. Frye
INVENTOR.
BY CASnow+Co.
ATTORNEYS.

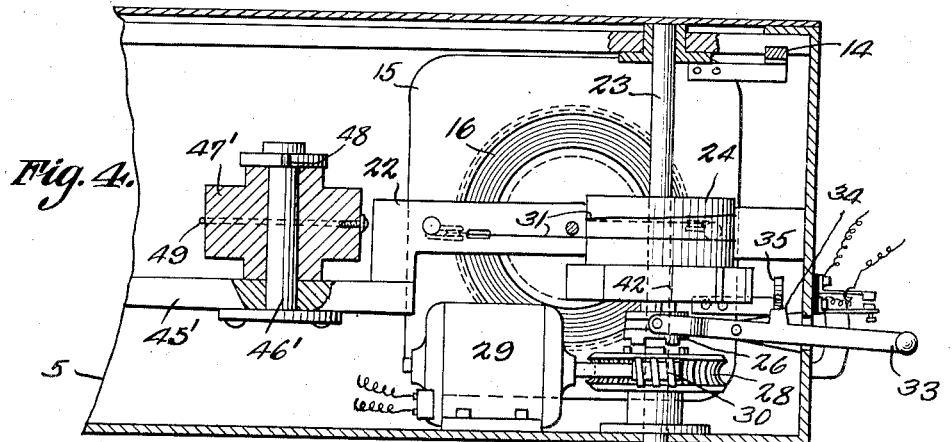

July 15, 1941.    J. D. FRYE    2,249,124
WEIGHING SCALES
Filed Aug. 9, 1939    5 Sheets-Sheet 4

J. D. Frye
INVENTOR.
BY CASnowTCo
ATTORNEYS.

July 15, 1941.   J. D. FRYE   2,249,124
WEIGHING SCALES
Filed Aug. 9, 1939   5 Sheets-Sheet 5
Fig. 10.
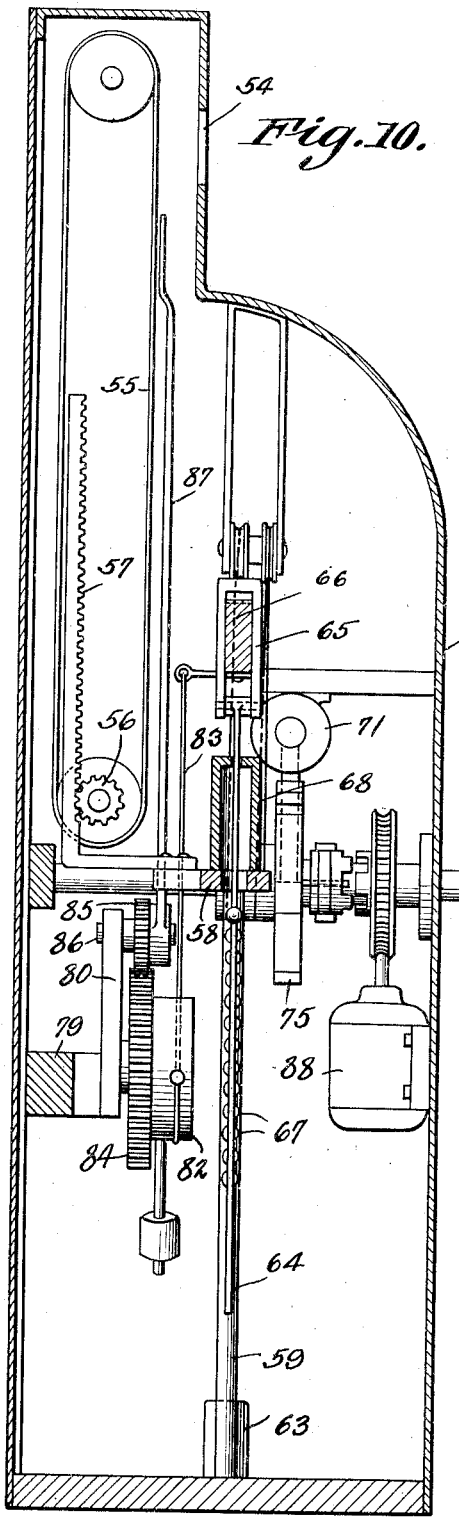
Fig. 11.
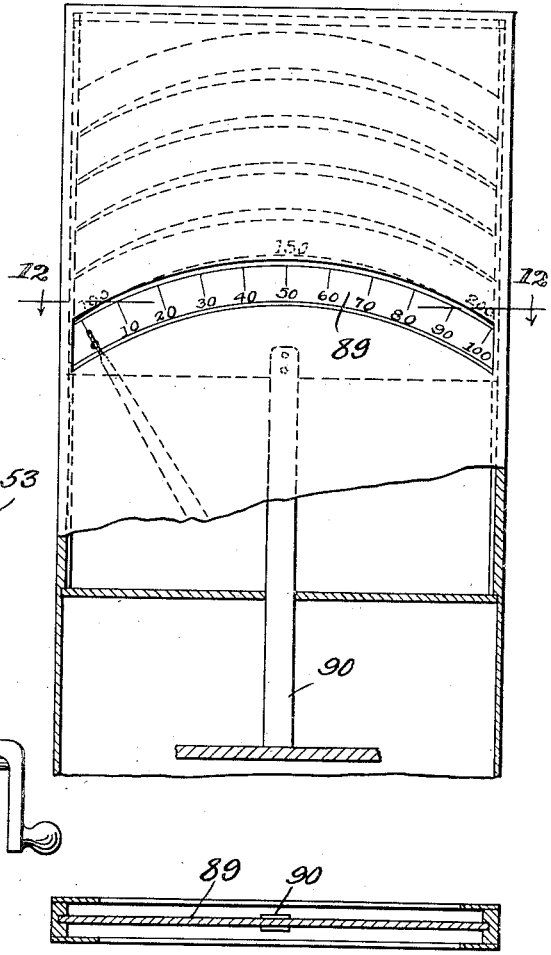
Fig. 12.
J. D. Frye
INVENTOR.
BY C. A. Snowles.
ATTORNEYS.

Patented July 15, 1941

2,249,124

UNITED STATES PATENT OFFICE 2,249,124

WEIGHING SCALES

James D. Frye, St. Johnsbury, Vt.

Application August 9, 1939, Serial No. 289,294

2 Claims. (Cl. 265—48)

This invention relates to weighing scales, and more particularly to scales designed for weighing heavy loads, however, it is to be understood that the principles of the invention may be effectively carried out in small scale construction.

An important object of the invention is the provision of a weighing scale of the poise and beam type, the poise being automatically brought into play by the action of the scale beam, when the indicator which is operated by the scale beam, and which also forms a part of the structure, reaches a predetermined point on the scale chart.

A further object of the invention is to provide mechanical means for returning the poise members to their initial positions, after a weighing operation, thereby resetting the scales for further use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 4 is a sectional view taken on line 4—4 of Figure 1.

Figure 5 is a fragmental part sectional elevational view through one portion of the scale, illustrating certain of the poise weights as having been picked up by the cone-shaped counterpoise, forming a part of the invention.

Figure 6 is a sectional view through the poise cage operating pulley, and illustrating the clutch and operating means for the pulley.

Figure 7 is a diagram of the electric circuits and wiring forming a part of the scale structure.

Figure 10 is a sectional view taken on line 10—10 of Figure 9.

Figure 11 is an elevational view of a modified form of the invention, and particularly the scale charts thereof.

Figure 12 is a sectional view taken on line 12—12 of Figure 11.

Figure 1:
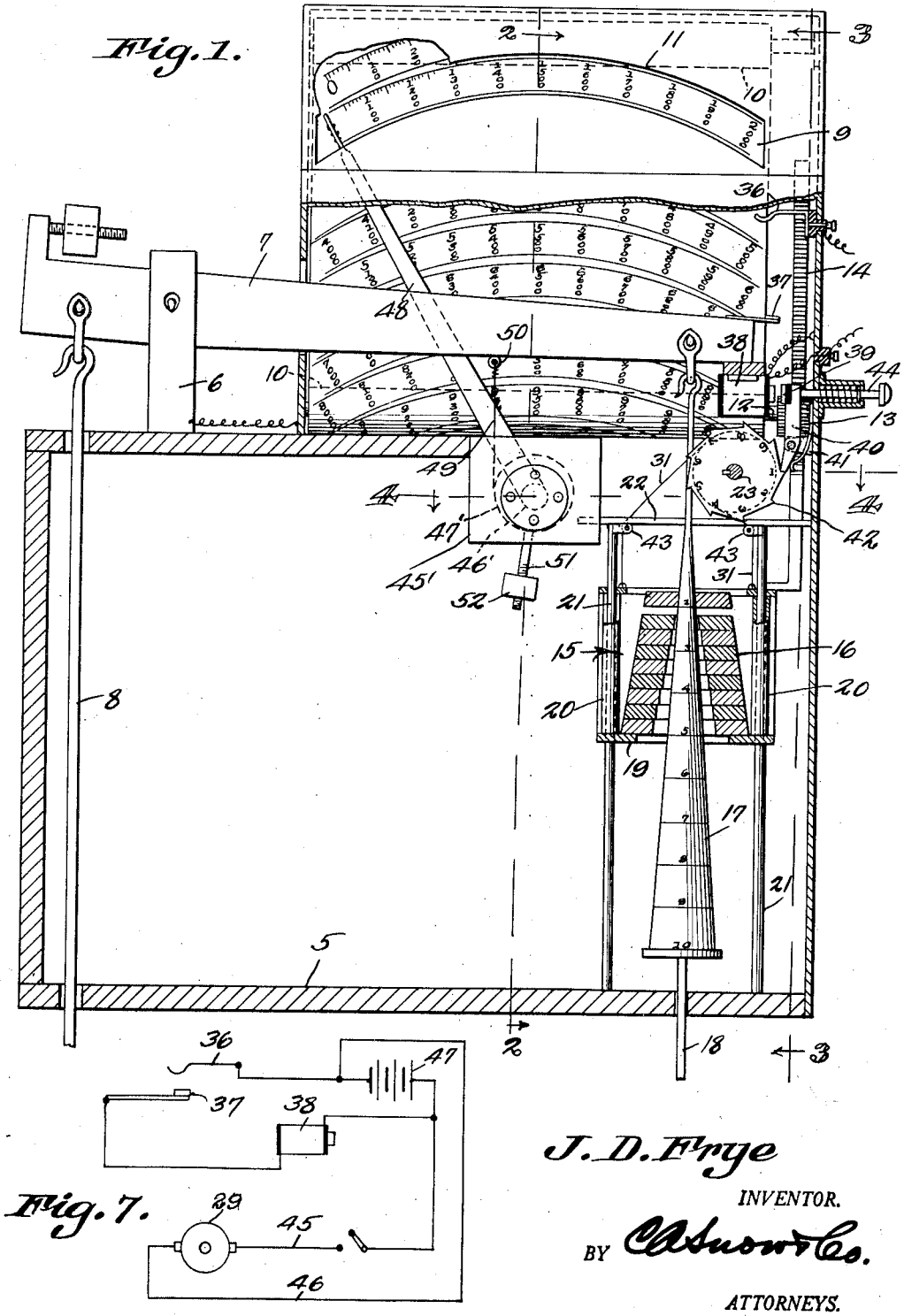
Figure 1 is an elevational view of a scale constructed in accordance with the invention, portions of the scale structure being shown in section.

Referring to the drawings in detail, the scale includes a body portion indicated generally by the reference character 5, which is provided with bearings 6 for supporting the scale beam 7, which is connected with the usual scale platform, through the medium of the connecting rod 8.

Figure 2:
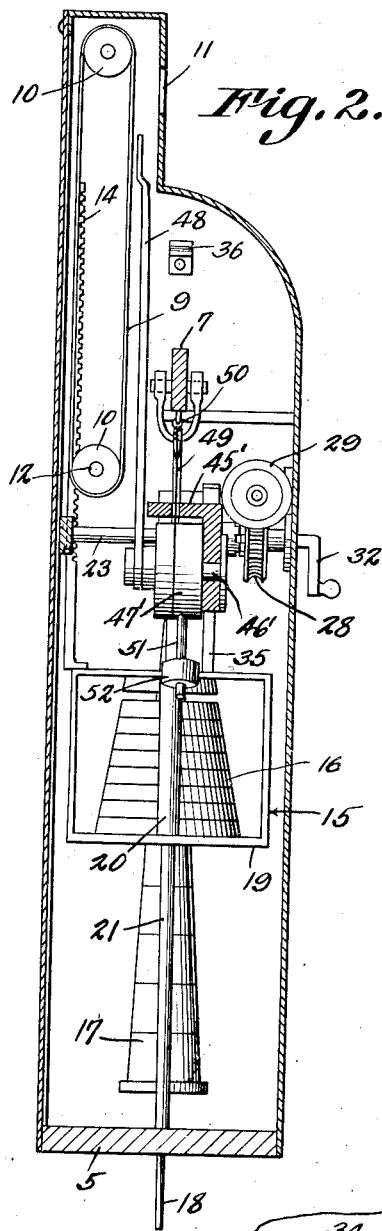
Figure 2 is a sectional view taken on line 2—2 of Figure 1.
Figure 3:
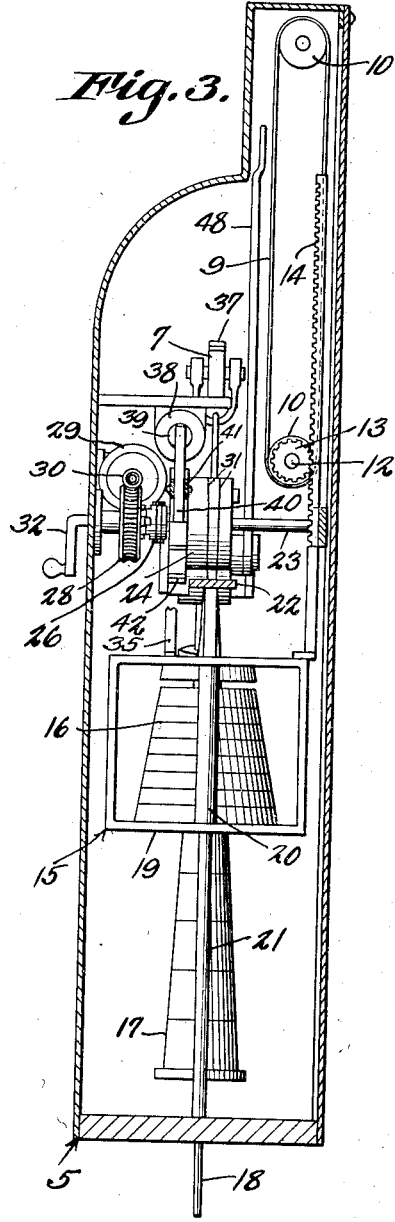
Figure 3 is a sectional view taken on line 3—3 of Figure 1.
Figure 8:
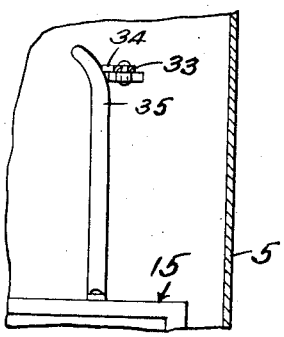
Figure 8 is a detail view of the automatic clutch operating mechanism.

The upper portion of the housing or body 5, provides a compartment for the endless web 9 which operates over the rolls 10 disposed at the upper and lower ends of the compartment, as clearly shown by Figure 2 of the drawings. The front wall of the body portion adjacent to the compartment is formed with a curved cut-away portion 11 through which graduations which are arranged on the endless web 9, may be observed. It is to be understood that graduations are formed on the endless web 9 to indicate predetermined weights, and these graduations are arranged in groups, as for example one group of graduations and indicia will indicate weight up to two thousand pounds. The adjacent lower group of graduations and indicia will weigh or indicate weight from two thousand pounds to three thousand pounds. It will of course also be understood that the succeeding groups of graduations and indicia will increase by one thousand pounds, the number of groups of graduations being varied, according to the weighing capacity of the scale.

Mounted on one end of the shaft 12 or the shaft on which the lowermost roll 10 is mounted, is a pinion 13 that is in mesh with the rack bar 14 that extends vertically at one end of the body portion, the lower end of the rack bar being connected with the vertically movable housing 15 which provides a support for the disk-like weights or poise members 16 which are formed with openings of graduated diameters, for the reception of the poise 17 which tapers towards the upper end thereof, the taper of the poise 17 being formed in such a way that as the housing 15 descends, the weights 16 will be picked up by the poise 17, adding weight to the poise, counterbalancing the beam 7. In order that the poise 17 will move in a true vertical line, a guide pin 18 extends from the lower end thereof and passes through a guide opening formed in the bottom of the body portion 5, as clearly shown by Figure 1 of the drawings.

The vertically movable housing 15 comprises a shelf 19 on which the weights rest, the shelf 19 being secured to the tubular guides 20 that move over the vertical rods 21, mounted within the body portion. Connected with the rods 21, at the upper ends thereof, is a supporting bar 22, above which the shaft 23 is mounted, the shaft 23 providing a support for the pulley 24, which is keyed thereto. The pulley 24 is formed with an extension 25 on which the clutch member 26 is splined. This clutch member 26 is designed to cooperate with the clutch face 27 formed on one side of the gear 28 which is loosely mounted on the shaft 23. The reference character 29 designates an electric motor provided with a worm gear 30 mounted on the free end of the shaft thereof, the worm gear meshing with the gear 28, so that when the clutch member 26 is moved to connect the gear 28 with the pulley 24, and the circuit to the motor 29 is completed, the gear 28 will be rotated to wind the cable 31, for purposes to be hereinafter more fully described.

A crank 32 is provided on one end of the shaft 23, and affords means whereby the shaft 23 may be manually operated to wind the cable 31 thereon.

The clutch member 26 is operated by means of the lever 33, and as shown, the lever 33 is formed with an enlargement 34 extending from one edge thereof, the enlargement lying in the path of upward movement of the finger 35 that is carried by the vertically movable housing 15, to the end that when the motor 29 is operating to rotate the pulley 24 to wind the cable 31 thereon, the lever 33 will be operated to disconnect the gear 28 from the pulley, when the housing 15 reaches the limit of its upward movement, thereby preventing further rotation of the pulley 24.

Mounted adjacent to the upper end of the rack bar 14, is a contact member 36 that is adapted to be engaged by the contact member 37 extending from the free end of the beam 7. These contact members are in circuit with the solenoid 38 so that when the contact members engage, and when the beam 7 has moved to the limit of its upward movement as the result of weight on the platform of the scales, the circuit to the solenoid will be completed, which will draw the armature 39 of the solenoid inwardly. The armature 39 is mounted on the upper end of the dog 40 that is pivotally mounted on the bracket 41, one end of the dog engaging the teeth 42 of the pulley 24, normally holding the pulley 24 against movement in one direction. The cable 31 which is wound on the pulley 24, extends through guides 43 and connects with the upper end of the vertically movable housing 15, so that when the dog 40 moves to disengage teeth of the pulley 24, the vertically movable housing 15 will descend, until the circuit to the solenoid has been broken, whereupon the dog 40 will be moved again into engagement with a tooth of the pulley 24, preventing further rotary movement of the pulley until the solenoid 38 is again energized, due to added weight on the platform of the scales. It will be obvious that as the vertically movable housing 15 moves downwardly, and the cone-shaped poise 17 contacts the disk-like weight members, the disk-like weight members will be picked up and supported by the poise 17, thereby supplying the added weight to the poise, necessary for accurate weighing.

When sufficient weight has been added to the poise 17, it is obvious that the beam 7 will move downwardly causing the contact members 36 and 37 to be disengaged, breaking the circuit to the solenoid 38.

Should it be desired to control the action of the solenoid 38 by a manual operation, the switch actuating member 44 has been provided, the switch actuating member being in the form of a pin that is moved through an opening in one end of the body portion, the inner end of the pin contacting with one end of the dog 40 to move the armature 39 into engagement with the solenoid 38. The solenoid in this case merely acts as a stop limiting the inward movement of the dog when the switch is manually operated.

The motor 29 is in circuit with a source of electricity supply, through the wires 45 and 46, which are shown as connected with the battery 47. Extending transversely of the body portion and mounted within the body portion, is an angle bar 45', which angle bar is formed with a bearing opening for the reception of the shaft 46' on which the drum 47' is eccentrically mounted. The shaft 46' is mounted at a point substantially intermediate the side edges of the body portion so that the indicator 48 which is mounted on the inner end of the shaft, is disposed substantially centrally of the endless web 9, to move across the endless web 9 to indicate weight. Secured to the drum 47', is a cable 49, which is wound on the drum 47', one end of the cable 49 extending through the eye 50 carried by the scale beam 7, so that movements of the scale beam 7 will operate to lengthen or shorten the cable, and rotate the drum 47' moving the indicator 48 across the endless web 9 to indicate degrees of weight.

Depending from the drum 47', is an arm 51 on which the adjustable weight 52 is mounted, the weight acting to normally urge the drum 47' in an anti-clockwise direction, or against the action of the scale beam 7. Thus it will be seen that due to this construction, when the scale beam moves downwardly, the weight will act to rotate the drum 47' holding the cable 49 taut at all times.

Figure 9:
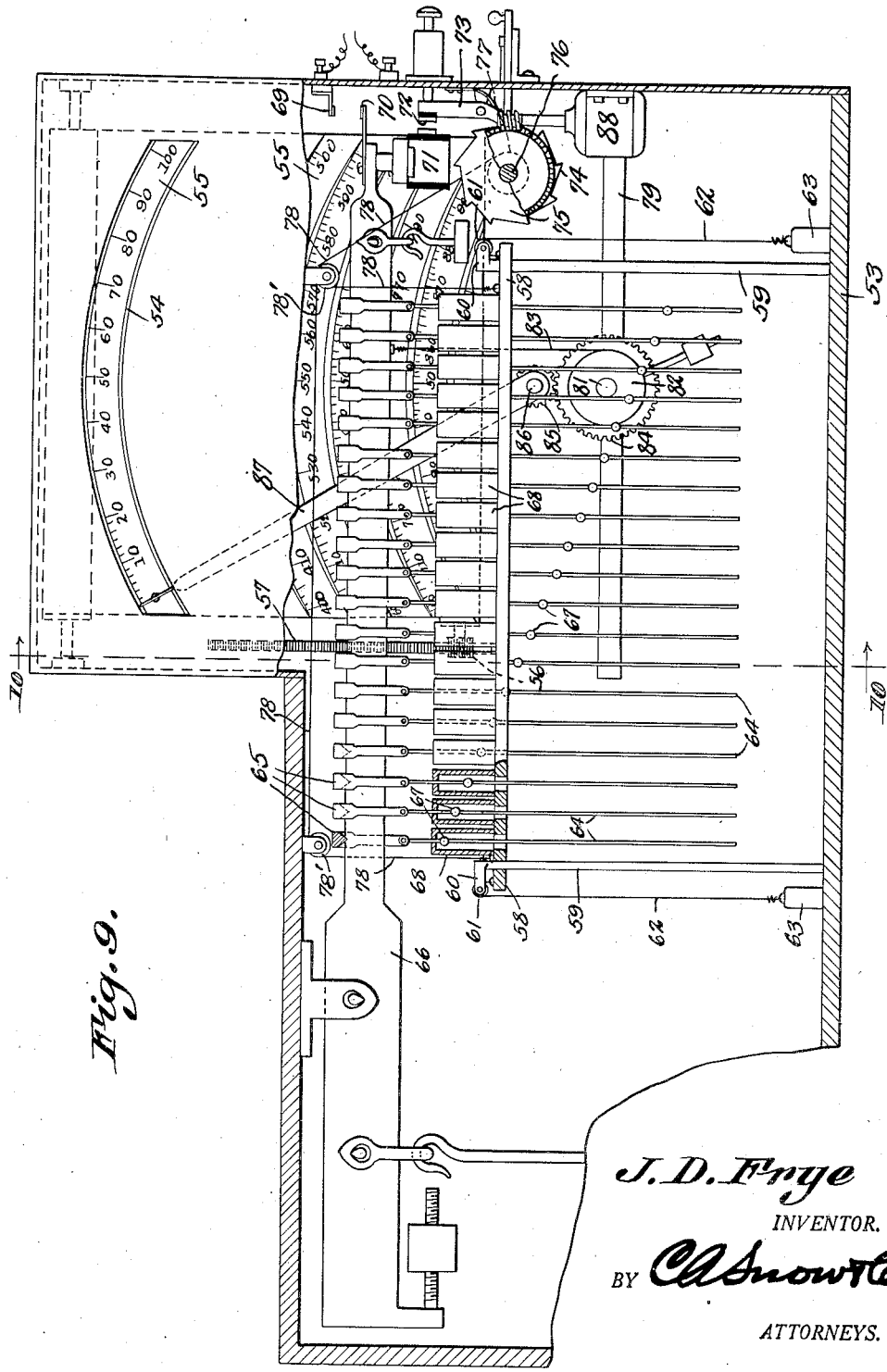
Figure 9 is a sectional view through a scale disclosing a modified form of the invention.

In the form of the invention as shown by Figures 9 and 10, the body portion is indicated generally by the reference character 53, the body portion having the sight opening 54 at the rear of which operates the endless web 55. The web 55 operates over rollers, one of the rollers having a gear 56 that meshes with the rack bar 57 rising from the bar 58 that extends transversely of the body portion. This bar is provided with openings disposed adjacent to the ends thereof, which openings accommodate the rods 59 that extend upwardly from the bottom of the body portion, the rods 59 acting as guides for the bar 58 to insure a true vertical movement of the bar 58 at all times. At the upper ends of the rod 59 are laterally extended arms 60 in which the rollers 61 are mounted, the rollers 61 accommodating the cables 62 that carry counterbalancing weights 63 at the free ends thereof.

The bar 58 is provided with a plurality of spaced openings through which the rods 64 operate. The rods 64 being connected with the hangers 65 that are arranged in spaced relation throughout a portion of the length of the scale beam 66. Secured to each of the rods 64 is a stop 67, which may be in the form of a ball, the stops of the rods 64 being disposed various distances from the hangers 65, the distance between the stops and hangers increasing towards the outer or free end of the beam 66, as clearly shown by Figure 9 of the drawings.

Tubular poise members 68 having closed upper ends rest on the bar 58, and have openings formed in the upper ends thereof, through which the rods 64 extend, the openings being of such diameters that they will not allow the stops 67 to pass therethrough. Thus it will be seen that as the bar 58 moves downwardly, the poise members 68 will be engaged by the stops 67, and as the bar 58 moves away from the poise member last picked up by the stop, the weight of the poise members supported by the rods 64, is transferred to the beam 66 adding weight to the beam until the weight of the material being weighed on the scale, balances the weight of the poise members and beam 66.

A switch member indicated at 69 is supported within the body portion and lies in the path of travel of the switch member 70 carried at the outer end of the scale beam 66. These switch members are in circuit with the solenoid 71 so that when the circuit is completed to the solenoid 71 through the switch members 69 and 70, the solenoid will be energized, attracting its armature 72, and since the armature 72 is carried at the upper end of the dog 73, the dog will be moved out of engagement with the teeth 74 of the wheel 75 mounted on one end of the shaft 76 and on which the drum 77 is mounted. Wound on the drum 77, are cables 78, which cables move over pulleys 78', from where they pass downwardly and connect with the bar 58 at the ends thereof, so that when the cables are unwound from the drum 77, the bar 58 is allowed to move downwardly a predetermined distance, allowing one of the poise members to be picked up by the stop of the rod operating through the poise member. It will of course be understood that these poise members are picked up in successive order, so that the required weight is added to the scale beam 66 automatically.

The reference character 79 designates a bar which is secured to the inner surface of the rear wall of the body portion of the scale, which bar provides a support for the plate 80 which is formed with a bearing opening for the stub shaft 81 on which the drum 82 is mounted. A cable 83 extends from the beam 66, and is wound on the drum 82, as shown by Figure 10 of the drawings. A gear indicated at 84 is mounted on the inner end of the drum 82 and meshes with the pinion 85 secured to the shaft 86 extending from the plate 80. The indicator 87 is also secured to the shaft 86 to move with the shaft and pinion 85. This indicator operates over the endless web 55 which is formed with groups of graduations, arranged successively along the endless web, the groups of graduations extending in the arcs of circles, from one edge of the web to another, the graduations indicating pounds and fractions of pounds weighed by the scale.

In this form of the invention a motor 88 is used for winding the cables 78 on the drum 77, to return the bar 58 and poise members 69, to their normal positions, as shown by Figure 9 of the drawings.

In Figure 11 of the drawings, I have shown a card 89 to be used in place of the endless web as previously described. This card is also provided with groups of graduations indicating pounds and fractions of pounds, the groups of graduations increasing in value successively, from the upper end of the card to the lower end thereof. In this form of the invention, the card is moved to expose a group of graduations of higher value, with each downward movement of the card, caused by a downward movement of the member 90, that in turn is moved downwardly in the same manner as the bar 58, shown in Figure 9 of the drawings.

The operation of the scale is as follows: Assuming that the platform of the scale is free of weight, and the indicator is in its neutral or non-indicating position, and an article weighing seventy-five pounds is placed on the platform of the scale, it is obvious that the platform will move downwardly in the usual way, and the indicator will move to a position directly over the seventy-five as appearing on the group of graduations appearing at the sight opening of the scale. Should the article being weighed weigh one hundred and fifty pounds, it is obvious that the indicator will move to the position directly over the last graduation of the group appearing before the sight opening. Owing to the weight of the article being weighed, the scale beam 7 will move to the limit of its upward movement, completing a circuit to the solenoid 38, which attracts the armature 39, moving the dog 40 to allow the cables wound on the drum 24 to unwind, permitting the housing 15 to move downwardly, with the result that the cone-shaped poise 17 will pick up the uppermost weight 16, adding weight to the scale beam 7 to counterbalance to a degree, the weight of the article being weighed. The indicator will now move over the endless web to a point directly opposite the graduation showing one hundred and fifty pounds. Since, it is to be understood that with the downward movement of the housing, the endless web has been also moved so that the adjacent group of graduations, and which is of a higher value, will be moved before the sight opening.

The operation of the scale as shown by Figures 9 and 10 of the drawings, is substantially the same as previously described, with the exception of the means for adding weight to the scale beam 66. In this form of the invention, as previously described, the poise members 68 are successively picked up by their rods, as the weight of the article being weighed, is increased.

What is claimed is:

1. Weighing scales comprising a body portion having a sight opening, a scale beam operating within the body portion, a movable member having groups of graduations arranged thereon, the graduations of the groups adapted to register with the sight opening to be viewed therethrough, an indicator operating within the body portion and movable over the graduations indicating measurements of weight, said indicator being visible through said sight opening, electrically controlled means for moving the graduated member to bring various groups of graduations before the sight opening, said electrical means including a normally inactive solenoid, a gear and a rack bar, a pivoted dog for normally holding the rack bar against movement, an armature carried on one end of the dog and adapted to be attracted by the solenoid when the solenoid is energized, releasing the dog and moving said rack bar, and poise members supported within the body portion adjacent to said beam and adapted to transfer to the beam counterbalancing the weight of the article being weighed.

2. Weighing scales comprising a pivoted scale beam, a plurality of poise rods arranged in spaced relation with each other throughout the length of the beam, enlargements on said poise rods, said enlargements being arranged various distances from the beam, a vertically movable bar having openings, supported under the beam, poise members resting on the bar and having openings, said poise rods extending through the openings of the bar and poise members, said enlargements adapted to engage the poise members lifting certain of the poise members with the rods and beam, according to the weight of the article being weighed, and said poise members adapted to move to their normal positions on the bar, when the scale beam returns to its normal position.

JAMES D. FRYE.